US008190786B2

(12) United States Patent
Nakahama

(10) Patent No.: US 8,190,786 B2
(45) Date of Patent: May 29, 2012

(54) DATA RECEIVER, DATA TRANSMITTER, AND INFORMATION PROCESSING METHOD, AND COMPUTER PROGRAM

(75) Inventor: Masahiko Nakahama, Kanagawa (JP)

(73) Assignee: Sony Corporation (JP)

( * ) Notice: Subject to any disclaimer, the term of this patent is extended or adjusted under 35 U.S.C. 154(b) by 444 days.

(21) Appl. No.: 12/148,704

(22) Filed: Apr. 22, 2008

(65) Prior Publication Data

US 2008/0270635 A1 Oct. 30, 2008

(30) Foreign Application Priority Data

Apr. 25, 2007 (JP) ................................ P2007-115028

(51) Int. Cl.
*G06F 3/00* (2006.01)

(52) U.S. Cl. ........................................................... 710/8

(58) Field of Classification Search ........................ 710/8
See application file for complete search history.

(56) References Cited

U.S. PATENT DOCUMENTS

| | | | | |
|---|---|---|---|---|
| 6,292,943 | B1 * | 9/2001 | Shin et al. | 725/58 |
| 2003/0214507 | A1 | 11/2003 | Mawatari et al. | |
| 2004/0080671 | A1 * | 4/2004 | Siemens et al. | 348/473 |
| 2005/0225547 | A1 | 10/2005 | Choi | |
| 2006/0031895 | A1 * | 2/2006 | Kwon et al. | 725/100 |
| 2006/0085627 | A1 * | 4/2006 | Noorbakhsh et al. | 713/1 |
| 2007/0055876 | A1 * | 3/2007 | Choi | 713/170 |
| 2007/0057931 | A1 | 3/2007 | Takamori | |
| 2007/0070402 | A1 | 3/2007 | Kitayama et al. | |

OTHER PUBLICATIONS

Stevan Eidson et al: "30.2: HDMI: High-Definition Multimedia Interface" 2003 SID International Symposium—May 20, 2003, Baltimore, Maryland, vol. XXXIV, May 20, 2003, p. 1024, XP007008293.

European Search Report, EP 08155038, dated Mar. 16, 2010.

* cited by examiner

*Primary Examiner* — Henry Tsai
*Assistant Examiner* — Juanito Borromeo
(74) *Attorney, Agent, or Firm* — Lerner, David, Littenberg, Krumholz & Mentlik, LLP

(57) ABSTRACT

A data receiver as a sink for receiving a transmission content from a source performing a content transmission process, the data receiver includes a memory for storing device information; and a control unit for changing a setup of a hot plug state in which the source may be detected, as a process of notifying the source whether the data stored in the memory can be obtained or not. The control unit is arranged to set the hot plug state as a setup indicative of being in a state where the data stored in the memory is permitted to be obtained, in a selection state where the source is selected as a contents input device, and control is performed to maintain a setup showing that the hot plug state is in a state where data stored in the memory is permitted to be obtained, in a case where the source is changed to a non-selection state from a selection state in which the source is selected as the contents input device.

8 Claims, 8 Drawing Sheets

FIG. 3

VENDER SPECIFIC DATA BLOCK

| BYTE# | 7 | 6 | 5 | 4 | 3 | 2 | 1 | 0 |
|---|---|---|---|---|---|---|---|---|
| 0 | VENDOR SPECIFIC TAG CODE | | | LENGTH | | | | |
| 1 | 24-BIT IEEE REGISTRATION IDENTIFIER | | | | | | | |
| 2 | | | | | | | | |
| 3 | | | | | | | | |
| 4 | A | | | | B | | | |
| 5 | C | | | | D | | | |
| 6 | SUPPORTS_AI | DC_48BIT | DC_36BIT | DC_30BIT | DC_Y444 | RSVD (0) | RSVD (0) | DVI_DUAL |
| 7 | Max_TMDS_CLOCK | | | | | | | |
| 8 | LATENCY_FIELDS_PRESENT | I_LATENCY_FIELDS_PRESENT | RSVD (0) | RSVD (0) | RSVD (0) | RSVD (0) | RSVD (0) | RSVD (0) |
| (9) | VIDEO_LATENCY | | | | | | | |
| (10) | AUDIO_LATENCY | | | | | | | |
| (11) | INTERLACED_VIDEO_LATENCY | | | | | | | |
| (12) | INTERLACED_AUDIO_LATENCY | | | | | | | |
| 9, 11 OR 13...N | RESERVED (0) | | | | | | | |

SOURCE PHYSICAL ADDRESS (bytes 4–5)

DATA RECEIVER, DATA TRANSMITTER, AND INFORMATION PROCESSING METHOD, AND COMPUTER PROGRAM

CROSS-REFERENCE TO RELATED APPLICATIONS

The present application claims priority from Japanese Patent Application No. JP 2007-115028, filed in the Japanese Patent Office on Apr. 25, 2007, the entire content of which is incorporated herein by reference.

BACKGROUND OF THE INVENTION

1. Field of the Invention

The present invention relates to a data receiver, a data transmitter, an information processing method, and a computer program, more particularly to a data receiver, a data transmitter, an information processing method, and a computer program for performing communications of an video signal or a control signal.

2. Description of the Related Art

HDMI (High Definition Multimedia Interface) is known as an interface standard for inputting and outputting a digital video and an audio. HDMI is the interface standard mainly aimed for inputting and outputting the digital video and the audio for a household appliance or an AV device. In particular, it has a configuration that DVI (Digital Visual Interface) of a digital interface used for connecting a personal computer with a display is further developed to transmit and receive a video signal, an audio signal, and a control signal together by one cable. A transmission side apparatus for performing contents transmission in compliance with a HDMI standard is referred to as a HDMI source and a contents receiving side apparatus is referred to as a HDMI sink.

In HDMI, TMDS (Transition Minimized Differential Signaling) which is a digital transmission system for a display video signal employed for DVI is used for a physical layer, and high-speed digital data transmission may be realized. TMDS is one of the means differentially transmitting the digital data, and includes links consisting of four channels in total for transmitting three types of video signals R (Red)/G (Green)/B (Blue), and a reference clock signal. Each video signal performs serial conversion on parallel signal of a 10-bit, and transmits 10-bit data per clock cycle. For example, if a clock is set to 500 MHz, 5G bit video data can be sent per a second (effective transmission rate of HDMI ver1.3 is 250 Mbps to 3.4 Gbps).

TMDS is a digital data transmission style which causes a pair of electric conductors, such as a twisted pair cable, to transmit the clock and NRZ (Non Return to Zero) data as differential signals. This type of transmission system has an advantage in that it is strong against variations in potential difference of a transceiver, can eliminate extraneous noises by common-mode voltage removal action, and can suppress unnecessary radiation. The transmission system can also be used for a high speed data transmission for a comparatively long distance of approximately 10-100 m.

Further, HDCP (High-bandwidth Digital Content Protection) is used as a contents protection system, such as illegal copy prevention of digital contents outputted and inputted by application of TMDS. In order to transmit the safe contents, before starting the contents transmission, an authentication process including a common process of an encryption key is performed between the transmitter (source) and a receiver (sink) of the contents. The authentication process is performed through a bidirectional bus set up in a HDMI interface, i.e., an IIC line referred to as DDC (Display Data Channel). By applying the encryption key shared between the transmitter and receiver in the authentication process, a contents transmission side (source) encrypts transmission contents to be outputted to a receiving side (sink). The receiving side (sink) decodes and reproduces the encrypted contents received from the transmitting side by using the encryption key.

Furthermore, in the HDMI standard, a CEC (Consumer Electronics Control) line which is a two-way communication line between the transmitter (source) and the receiver (sink) is set to transmit user operation information on the transmitter (source) side or receiver (sink) side to a HDMI device via a CEC line, allowing various processes to be performed. For example, a power supply of TV is turned OFF by a remote control unit of TV being a receiver (sink), to realize “all-off” in which a power supply of a device connected to a HDMI terminal is also turned OFF. Further, contents replay is started on a video side and a power supply of a target device, such as TV, AMP, etc. is turned ON to realize one-touch play for switching to a connected HDMI input.

For example, the receiver (sink) as a contents reproduction device, such as TV can be connected with the transmitter (source) which is an apparatus for providing various contents. In particular, the apparatus includes a DVD player, a video tape-recorder, a tuner, etc. According to the HDMI standard, the transmitter (source) which is set to be selected by the receiver (sink) can obtain the information stored in a device information storing memory (EDID-ROM) provided to the receiver (sink). However, when the source is not in the selection state, the source in the non-selection state cannot obtain the information in the device information storing memory (EDID-ROM) of the sink. The device information storing memory (EDID-ROM) has stored therein resolution information of the contents which can be reproduced in the receiver (sink), signal format information which is accepted by a display, and the like. for example. When performing a process of transmitting the contents, the contents selection and data processing are performed in accordance with this information.

Further, a physical address (Physical address) which is required in order to perform the data communications is recorded in the device information storing memory (EDID-ROM) of the receiver (sink). The transmitter (source) obtains the physical address from the device information storing memory (EDID-ROM) of the receiver (sink), and performs an address mapping process enabling communications through HDMI. This address mapping is performed by using the CEC line which is the two-way communication line between the transmitter (source) and the receiver (sink) as described above.

As described above, however, according to the HDMI standard, the transmitter (source) which is not set to be selected by the receiver (sink) cannot obtain the information stored in the device information storing memory (EDID-ROM) provided to the receiver (sink), therefore the communications cannot be performed between the transmitter (source) which is not set as the selection state, and the receiver (sink) via the CEC line. In other words, the address mapping process, the all-off by means of the CEC, the one-touch play, etc. cannot be used at all.

SUMMARY OF THE INVENTION

In view of the issues, the present invention is made and provides a data receiver, a data transmitter, an information processing method, and a computer program, in which irrespective of a selection state set up by a receiver (sink), a transmitter (source) is allowed to obtain device information from a memory of the receiver (sink), and communication of control information between the transmitter (source) in the non-selection state, and the receiver (sink) is enabled.

A first aspect of the present invention is a data receiver as a sink for receiving transmission contents from a source for performing a contents transmission process. The data receiver includes a memory having stored therein device information, and a control unit for changing a setup of a hot plug state where the source can be detected as a process of notifying the source whether or not obtainment of the data stored in the memory are allowable. The control unit has a configuration in which control is performed to maintain a setup indicating that the hot plug state is in a state where the data stored in the memory are permitted to be obtain, in a selection state where the source is selected as a contents input device, and a setup indicating that the hot plug state is in the state where data stored in the memory are permitted to be obtained, in the case where the source is changed to the non-selection state from the selection state in which the source is selected as the contents input device.

Further, in an embodiment of the data receiver in accordance with the present invention, the control unit has a configuration in which control is performed to temporarily change the setup to one indicating that the hot plug state is in a state where obtainment of the data stored in the memory is not permitted, and then rechange the setup to one indicating that the hot plug state is in a state where obtainment of the data stored in the memory is permitted, in the case where the source is changed to the selection state from the non-selection state in which the source is not selected as the contents input device.

Furthermore, in one embodiment of the data receiver of the present invention, the control unit has a configuration in which control is performed to temporarily change a setup to one indicating that the hot plug state is in the state where obtainment of the data stored in the memory are not permitted, in the case where the source is changed to the selection state from the non-selection state in which the source is not selected as the contents input device, and then rechange the setup to one indicating that the hot plug state is in the state where obtainment of the data stored in the memory is permitted, whereby setup of authentication start conditions between the source and the sink is performed.

Still further, in one embodiment of the data receiver of the present invention, it is arranged that address information to be applied to address mapping by the source is stored in the memory, and the control unit performs control to permit the source to read the address information stored in the memory, even in the non-selection state where the source is not selected as the contents input device.

Even further, in one embodiment of the data receiver of the present invention, it is arranged that the source and sink are connected by a HDMI (High Definition Multimedia Interface) cable, and the control unit has a configuration in which the hot plug state is set to be "high" in the selection state where the source is selected as the contents input device, to maintain the hot plug state to be "high" even in the case where the source is changed to the non-selection state from the selection state in which the source is selected as the contents input device, and to change the hot plug state to "low" temporarily when the source is changed to the selection state from the non-selection state in which the source is not selected as the contents input device, then to rechange it to "high" again.

Furthermore, in one embodiment of the data receiver of the present invention, even in the non-selection state where the source is not selected as the contents input device, the control unit is arranged to perform control allowing information and communications process via a control information communications line between the source and the sink.

Still further, in one embodiment of the data receiver of the present invention, the control information communications line is a CEC (Consumer Electronics Control) line specified in a HDMI standard.

Even further, a second aspect of the present invention is a data transmitter as a source which performs contents transmission to a sink. The data transmitter includes a hot plug detection unit which detects a state of a hot plug connected with the sink and a control unit which determines whether or not obtainment of data stored in a device information storing memory provided for the sink is allowable according to a state detected by the hot plug detection unit and reads the data stored in the device information storing memory according to a determination result. The hot plug detection unit detects a hot plug state in a setup where obtainment of data stored in the device information storing memory is allowed, in the case where the data transmitter is in a non-selection state of not being selected as a contents input device for the sink. The control unit reads the data stored in the device information storing memory in a time period where the data transmitter is in the non-selection state.

Furthermore, a third aspect of the present invention is an information processing method in a data receiver as a sink for receiving transmission contents from a source for performing a contents transmission process. As a process of notifying the source of whether or not data stored in a device information storing memory provided for the data receiver are obtainable, a control unit performs a hot plug control step of changing a setup of a hot plug state which can be detected by the source. The hot plug control step is a step of setting the hot plug state as a setup indicative of being in a state where the data stored in the memory are permitted to be obtained, in the selection state where the source is selected as the contents input device, and performing control to maintain the hot plug state to be the setup indicative of being in the state where the data stored in the memory are permitted to be obtained, when the source is changed to the non-selection state from the selection state in which the source is selected as the contents input device.

Moreover, in one embodiment of the information processing method in accordance with the present invention, the hot plug control step further includes a step of performing control to temporarily change the hot plug state to a setup indicative of being in a state where the data stored in the memory are not permitted to be obtained when the source is changed to the selection state from the non-selection state of not being selected as the contents input device, and then rechange the hot plug state again to the setup indicative of being in the state where the data stored in the memory are permitted to be obtained.

Further, a fourth aspect of the present invention is a computer program for implementing an information process in a data receiver as a sink which receives transmission contents from a source which performs a contents transmission process. The program includes a step of causing a control unit to perform a hot plug control step of changing a setup of a hot plug state which can be detected by the source as a process of notifying the source of whether or not data stored in a device information storing memory provided for the data receiver are obtainable. The hot plug control step is a step of setting the hot plug state as a setup indicative of being in a state where the data stored in the memory are permitted to be obtained in the selection state where the source is selected as the contents input device, and performing control to maintain the hot plug state to be the setup indicative of being in the state where the data stored in the memory are permitted to be obtained in the case where the source is changed to the non-selection state from the selection state of being selected as the contents input device.

In addition, the computer program of the present invention is a computer program which can be provided for a general-purpose computer system which can perform various program codes by, for example, a storage medium and a communication medium in a computer-readable form. By providing such a program in the computer-readable form, a process based on the program is realized on the computer system.

Further purposes, features, and advantages of the present invention will become clear by detailed description with reference to embodiments of the present invention to be described later and the accompanying drawings. In addition, in this specification, by system is meant a logical set structure of a plurality of apparatuses, and it is not limited to one that has apparatuses of respective structures in the same casing.

According to a structure of an embodiment of the present invention, even in the case where the source is changed from the state of being selected as the contents input device to the non-selection state, the state of the hot plug is set up to remain "high", whereby the source in the non-selection state can obtain data in the device information storing memory (EDID-ROM) on the sink side, and it becomes possible to perform the address mapping process, to obtain the resolution information of the sink device, the acceptable format information, etc., and to perform various types of control accompanied by communications between the source and the sink by means of the CEC line, such as the all-off, the one-touch play, and the like, for example.

BRIEF DESCRIPTION OF THE DRAWINGS

FIG. 3 is a chart showing an example of the data stored in the device information storing memory (EDID-ROM) on the sink side;

DETAILED DESCRIPTION OF THE EMBODIMENTS

Hereafter, with reference to the drawings, a data receiver, a data transmitter, an information processing method, and a computer program in accordance with the present invention will be described in detail.

Figure 1:
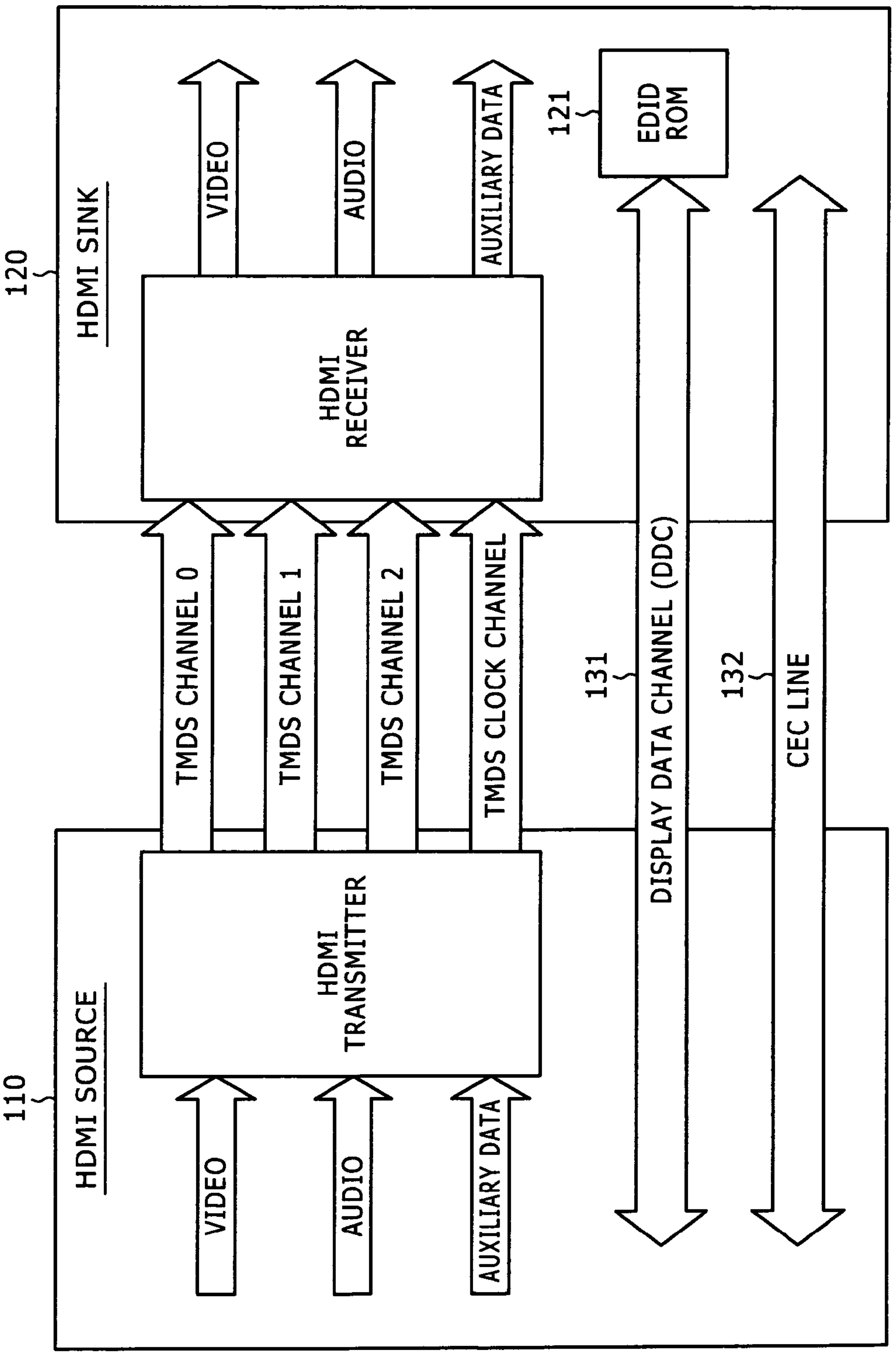
FIG. 1 is a diagram for explaining an outline of a HDMI (High Definition Multimedia Interface) standard.

Firstly, with reference to FIG. 1, an outline of a HDMI (High Definition multimedia Interface) standard will be described. FIG. 1 shows a transmitter [HDMI source] 110 which performs contents transmission in compliance with the HDMI standard, and a receiver [HDMI sink] 120 which receives contents.

As described above, HDMI uses TMDS (Transition Minimized Differential Signaling) which is a digital transmission system for a display video signal to enable realization of high-speed digital data transmission. TMDS is one of the means which carry out differential transmission of the digital data, and includes links consisting of four channels in total for three types of video signals (TMDS Channel 0-2) of R (Red)/G (Green)/B (Blue), and a transmission channel (TMDS clock channel) for a reference clock signal. Each video signal perform a serial conversion on parallel signal of 8-bit parallel signal, adds 2-bit redundant bits, and transmits 10-bit data per a clock cycle. An audio signal (Audio) is superimposed on a blanking section of an video signal (Video). For example, if the clock is set to be 500 MHz, 5G bit video data can be sent per a second (effective transmission rate of HDMI ver1.3 is 250 Mbps to 3.4 Gbps).

In the HDMI sink (Sink) 120 which receives the contents transmitted from the HDMI source (Source) 110, a TMDS signal is decoded, the video signal (Video) and the audio signal (Audio) are decoded to perform a reproduction process.

As described above, HDCP (High-bandwidth Digital Content Protection) is used as a contents protection system for preventing illegal copy of digital contents outputted and inputted by application of TMDS. In order to transmit the contents safely, before starting the contents transmission, an authentication process including a share process of an encryption key is performed between the transmitter (source) and the receiver (sink) of the contents. The authentication process is performed through a bidirectional bus set up in a HDMI interface, i.e., an IIC line 131 referred to as DDC (Display Data Channel.) as shown in FIG. 1. By applying the encryption key shared between the transmitter and receiver in the authentication process, on a contents transmission side (source), transmission contents are encrypted and outputted to a reception side (sink). The reception side (sink) decodes and reproduces the encrypted contents received from the transmitter side by using the encryption key.

Further, as shown in FIG. 1, in the HDMI standard, a CEC (Consumer Electronics Control) line 132 which is a two-way communication line between the transmitter (source) 110 and the receiver (sink) 120 is set. For example, user operation information on the transmitter (source) or receiver (sink) side is transmitted to a HDMI device through the CEC line 132 to enable various processes. In particular, a power supply of TV is turned OFF by a remote control unit of TV which is a receiver (sink), to realize "all-off" with which a power supply of a device connected to a HDMI terminal is also turned OFF together. On starting contents replay on a video side, a power supply for a target device, such as TV, AMP, etc. which are for connecting devices is turned ON to realize one-touch play which allows the contents to be reproduced.

As shown in FIG. 1, the receiver (sink) 120 has a device information storing memory (EDID-ROM) 121. The device information storing memory (EDID-ROM) 121 has stored therein resolution information of the contents which can be reproduced in the receiver (sink) 120, such as for example TV, signal format information which is accepted by a display, etc. For example, when performing a process of transmitting the contents, the transmitter (source) 110 performs contents selection and data processing according to this information.

A physical address (Physical address) which is required in order to perform the data communications by means of a HDMI cable is further recorded in the device information storing memory (EDID-ROM) 121, and the transmitter (source) 110 obtains the physical address from the device information storing memory (EDID-ROM) 121 of the receiver (sink) 120, and performs the address mapping process of enabling communications through HDMI. The address mapping is carried out by using the CEC line 132.

Figures 2A, 2B:
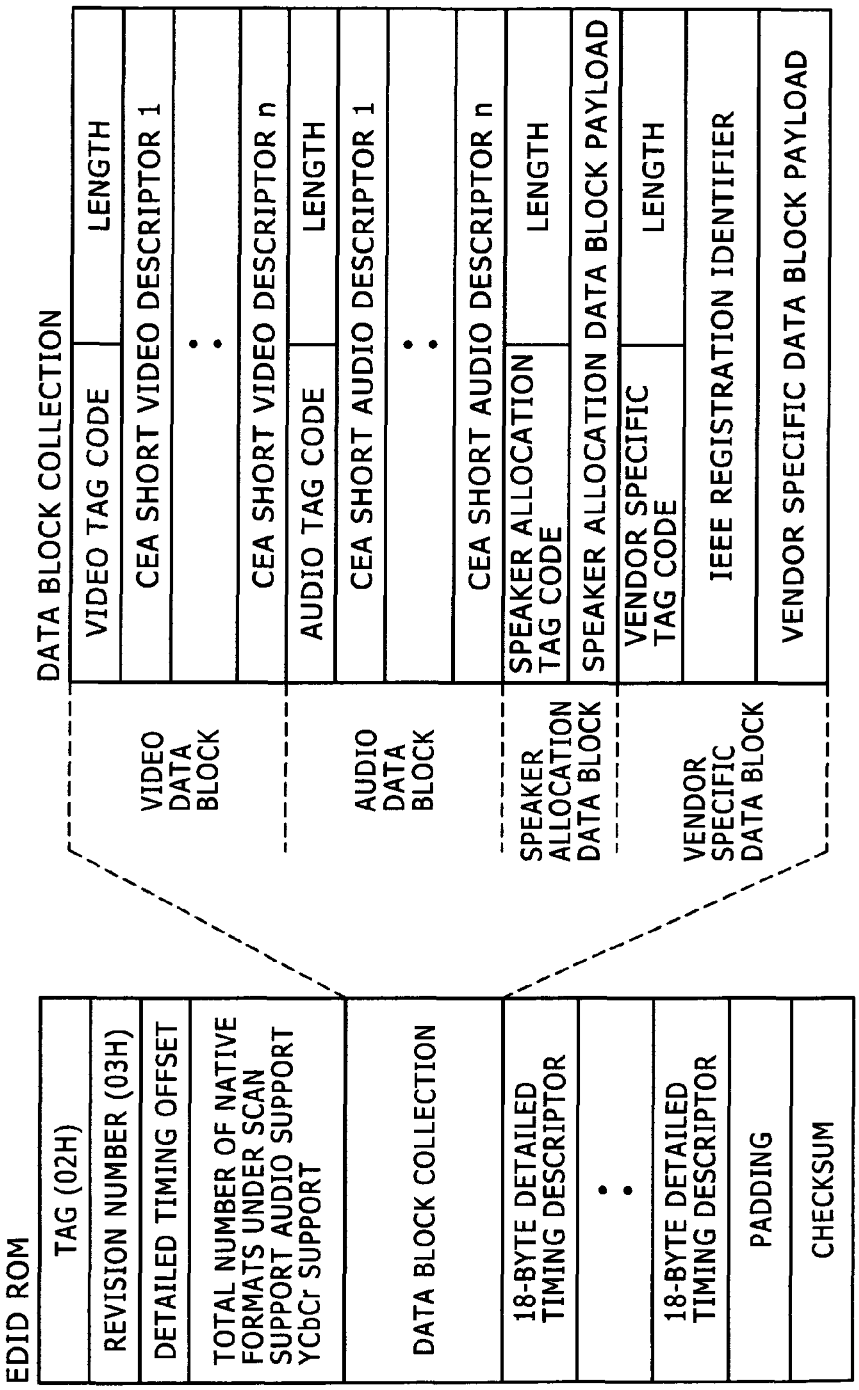
FIG. 2 is a chart showing an example of data stored in a device information storing memory (EDID-ROM) on a sink side.

Examples of the data stored in the device information storing memory (EDID-ROM) 121 are shown in FIGS. 2 and 3. FIG. 2(*a*) is the whole structure of the data stored in the device information storing memory (EDID-ROM) 121, and FIG. 2(*b*) is a data structure of [Data block collection], being a part of the data. [Data block collection] includes [Video Data Block], [Audio Data Block], [Speaker Allocation Data Block], and [Vender Specific Block].

[Vender Specific Block] is a data area including an area in which data, such as Deep Color and Latency, can be written at a vendor of the HDMI devices, such as the HDMI receiver (sink), and has a data structure as shown in FIG. 3.

FIG. 3 illustrates a structure of [Vender Specific Block], and shows each of the stored data of bytes 0-N from the upper row. A source physical address is stored at bytes 4 and 5. This source physical address is data used for the address mapping process for performing communications by means of the HDMI cable. The source physical address includes address information of four bits, each being A, B, C, and D.

Figure 4:
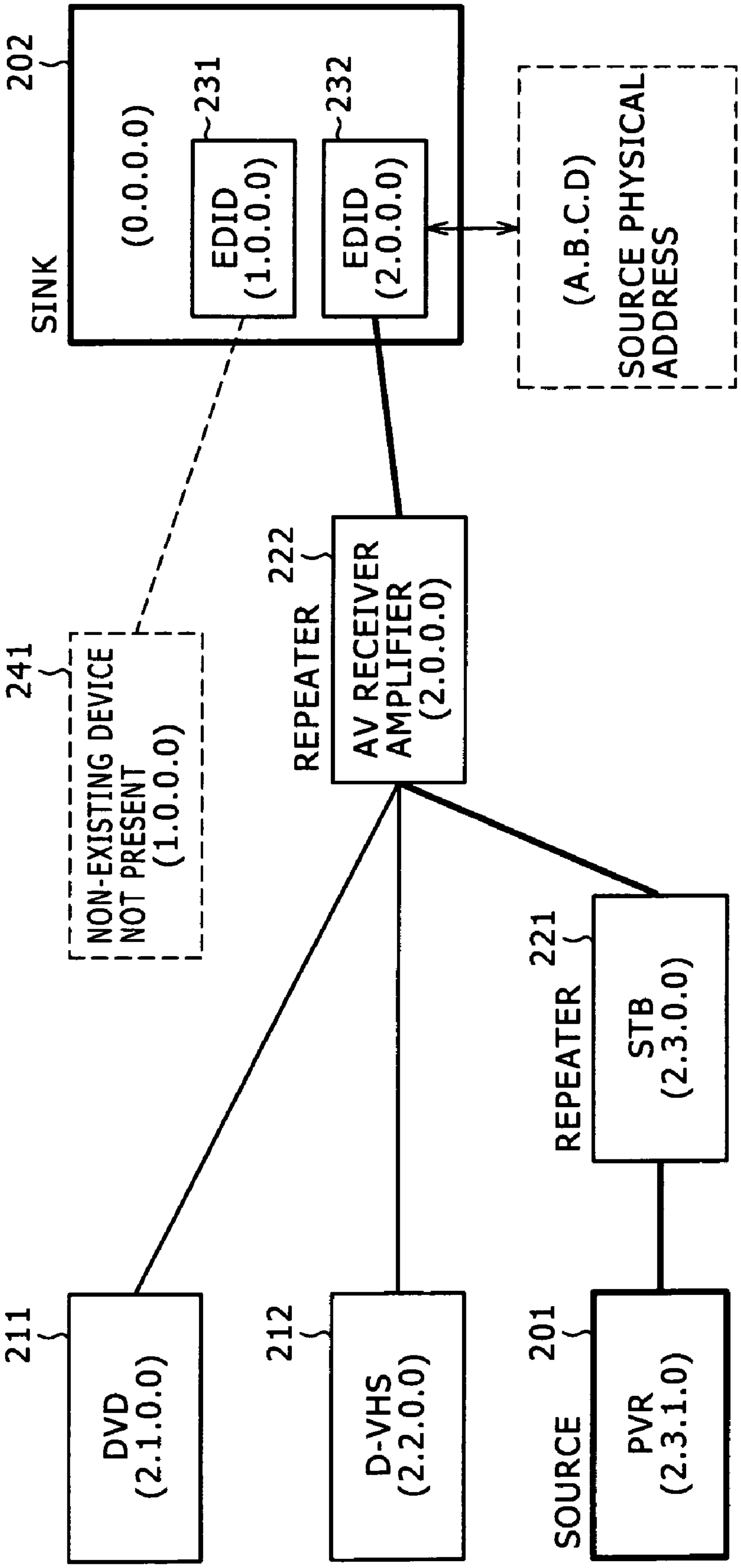
FIG. 4 is a diagram for explaining a specific example of an address mapping process using source physical addresses.

A particular example of the address mapping process using the source physical address will be described with reference to FIG. 4. FIG. 4 shows a source 201 which performs a contents transmission process, and a sink 202 which performs contents reception. Although the source 201 and the sink 202 may be connected directly, in many cases, other devices are interposed between the source 201 and the sink 202. These devices are referred to as repeaters. Repeaters 221 and 222 are shown in the figure.

As described above, the sink 202 can set a plurality of sources 201, 211, and 212 as contents input devices. The figure illustrates an example in which the sink 202 sets the source 201 as the contents input device. In this case, the selected source 201 obtains the physical address which is the data stored in the device information storing memory (EDID-ROM) of the sink 202, and performs the address mapping process. In addition, as shown in the figure, the sink 202 can store a plurality of physical addresses in the device information storing memory (EDID-ROM).

The physical address stored in the device information storing memory (EDID-ROM) contains therein address information on a higher side device to which the sink 202 is connected directly. In the example as shown in FIG. 4, the sink 202 has EDID 231 having stored therein a physical address (1.0.0.0) corresponding to a non-existing device 241, and EDID 232 having stored therein a physical address (2.0.0.0) corresponding to the repeater 222.

By way of the address mapping process performed by the source 201, an address is set to each of the source, the sink, and the repeater which perform communications through the HDMI cable. The physical address of the sink 202 as shown in the figure is set as (0.0.0.0), and an address is assigned to each device connected to the sink 202. In addition, four data which constitute the physical address (0.0.0.0) respectively correspond to the data A, B, C, and D constituting source address information which is described with reference to FIG. 3. In other words, it is set as 16-bit address information (A.B.C.D) of each four bit data.

As for the devices connected to the higher side of the sink 202 in which the physical address (0.0.0.0) is set, addresses, such as (1.0.0.0), (2.0.0.0.), (3.0.0.0), . . . whose top address A is incremented like 1, 2, 3, . . . are set. In other words, the sink is set as (A, B, C, D)=(0.0.0.0), and each device higher by one is provided with the physical address where the value of A is set as 1, 2, 3, . . . .

As for the device which is connected to a still higher rank than the high rank device connected to the sink, the address is set such that the value of A is set to the same value as that of A of the connection device and the value of B is set as 1, 2, 3, . . . . In the example of the figure, there are three devices connected to the higher order than the repeater 222 in which the physical address (2.0.0.0) is set. The addresses of these three devices are set as (2.1.0.0), (2.2.0.0), and (2.3.0.0). Further, the physical addresses are set up where A and B of the physical addresses of the device connected to the higher rank and the device connected to the lower rank are same and the value of C is varied as 1, 2, and 3. In the example in the figure, it is arranged that the source 201 is connected to the higher rank of the repeater 221 having the physical address (2.3.0.0), and the physical address of this source 201 is set to be (2.3.1.0).

The source 201 reads the source physical address (2.0.0.0) stored in EDID 232 prior to transmitting the contents to the sink 202, sets this address to the repeater 222, set an address in compliance with the rule to the higher rank device. In other words, by way of a process where an address in which B of (A, B, C, D) is sequentially varied is set up and an address in which the value of C is changed is set for a still higher rank device, the address corresponding to each device is set up to perform address mapping of a network connection device, whereby a contents transmitting path with respect to the sink 202 is determined. An example shown in FIG. 4 illustrates a communication path (source 201→repeater 221→repeater 222→sink 202). In addition, this address mapping process is carried out by using the CEC line 132 shown in FIG. 1.

For example, for the sink 202 which is the contents reproduction device, such as TV, it is possible to select as the contents input device of the transmitter (source) which is an apparatus for providing various contents. In particular in the example FIG. 4, the source 211 as a DVD player, the source 212 as a video tape-recorder, and the source 201 as PVR can be selected as the sources.

According to the HDMI standard, the source in which the sink 202 is set to be selective state, can obtain the information stored in the device information storing memory (EDID-ROM) provided for the sink. However, in the case where the source is not in selection state of the sink, a non-selection source cannot obtain the information stored in the device information storing memory (EDID-ROM). As described above, the resolution information on the contents which can be reproduced in the sink (for example), the signal format information which is accepted by the display, and the physical address information applied to the address mapping, etc. are stored in the device information storing memory (EDID-ROM). When performing the process of transmitting the contents, the address mapping process according to this information is carried out, to establish a contents transmitting route and to carry out the contents selection and data processing applicable to the sink.

As described above, however, according to the HDMI standard, the transmitter (source) which is not set the receiver (sink) to the selection state cannot obtain the information stored in the device information storing memory (EDID-ROM) provided with the receiver (sink), therefore, the process through the CEC line cannot be performed between the non-selection state source and the sink. In other words, the address mapping process, the all-off by using the CEC, the one-touch play, etc. cannot be used at all.

By inputting the information as to whether or not sink side is at selection state, each source can obtain the information stored in the device information storing memory (EDID-ROM), only when the selection state is confirmed. An apparatus structure on this mechanism, i.e., the sink side, and hot plug control will be described with reference to FIG. 5.

Figure 5:
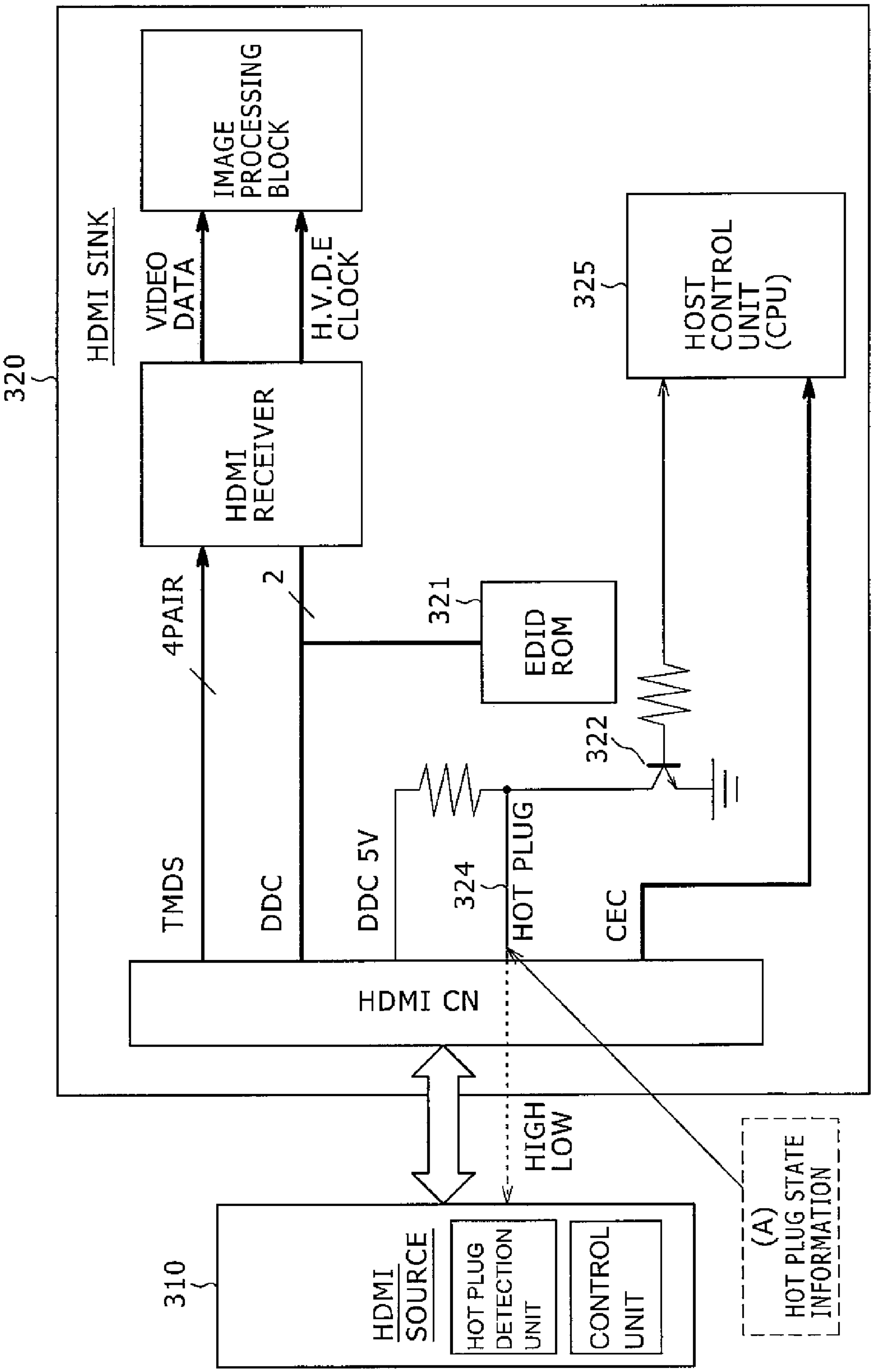
FIG. 5 is a diagram for explaining a structure of an apparatus and hot plug control on the sink side.

FIG. 5 is a figure showing a detailed structure of a receiver (sink) 320. The receiver is connected with a contents transmitter (source) 310 by means of the HDMI cable. In addition, as described with reference to FIG. 4, the repeater may exist between the source and the sink.

A host control unit (CPU) 325 of the receiver (sink) 320 controls a base voltage of a transistor 322 according to selection of the source, and changes a state of the hot plug 324 connected with the source to a high state or a low state. The state of this hot plug 324 is notified to the hot plug detection terminal of the source 310 through the HDMI cable, and the source 310 can determine whether or not the source is selected as the contents input device.

The source 310 performs various processes according to the state of this hot plug detection terminal. In other words, mutual authentication processing between the source and the sink, address mapping performed by reading and implementing data in EDID-ROM 321 having stored therein the source physical address, etc. are carried out.

Figure 6:
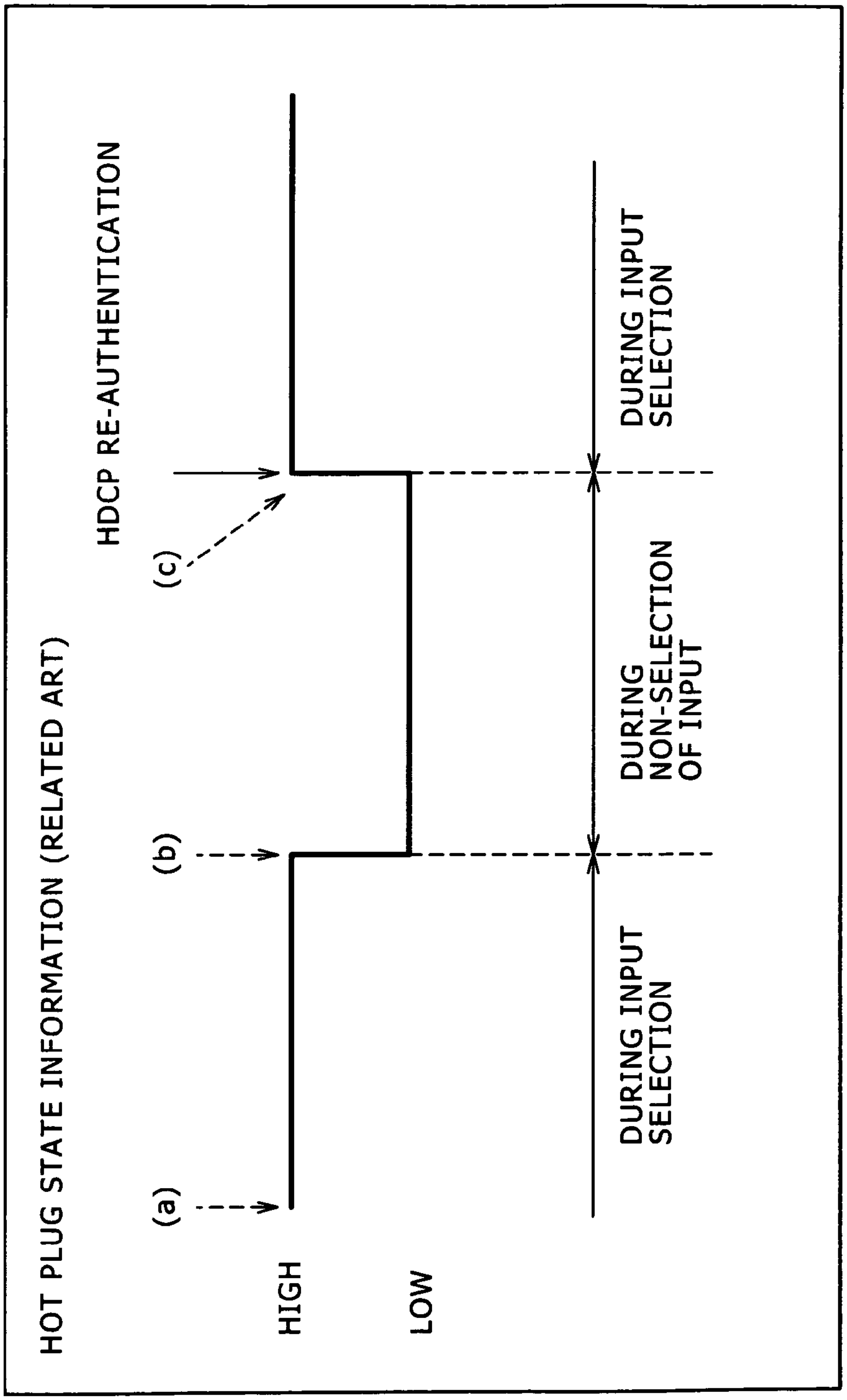
FIG. 6 is a chart showing an example of a known hot plug change state.

The host control unit (CPU) 325 of the receiver (sink) 320 controls the base voltage of the transistor 322, and changes the state of the hot plug 324. An example of transition of the hot plug state is shown in FIG. 6. A section "ab" is a period when the source is in the selection state as the contents input device, during the time period, the host control unit (CPU) 325 sets the state of the hot plug 324 as "high". In this selection state, the selection source is allowed to read the data in EDID-ROM 321.

A section "bc" is a time period when the source in a non-selection state as the contents input device, and during this time period, the state of the hot plug 324 is set to "low", and during this period, the non-selection source is not allowed to read the data in EDID-ROM 321.

Further, a point "c" is a point at which the source is again set as the selection state as the contents input device. At a timing when this non-selection state is changed to the selection state, the authentication process is started which is the authentication process specified to be performed between the selection source and the sink. After completion of the authentication process, substantive processes, such as the contents transmission etc. are permitted.

However, as described above, only when the hot plug is in the "high" state, it is permitted to read record data from the device information storing memory (EDID-ROM) on the sink side, on the other hand, the reading is not permitted in the non-selection state. This is specified in [HDMI Ver1.3 Specification] which specifies the standard of HDMI, for example.

Therefore, the source in the non-selection state cannot obtain the data stored in the device information storing memory (EDID-ROM) of the sink device, and it is in a state where it is not possible to perform the address mapping process as described above with reference to FIG. 3, or to obtain information, such as resolution information and format information to be accepted by the sink device, such as TV, or the like.

Figure 7:
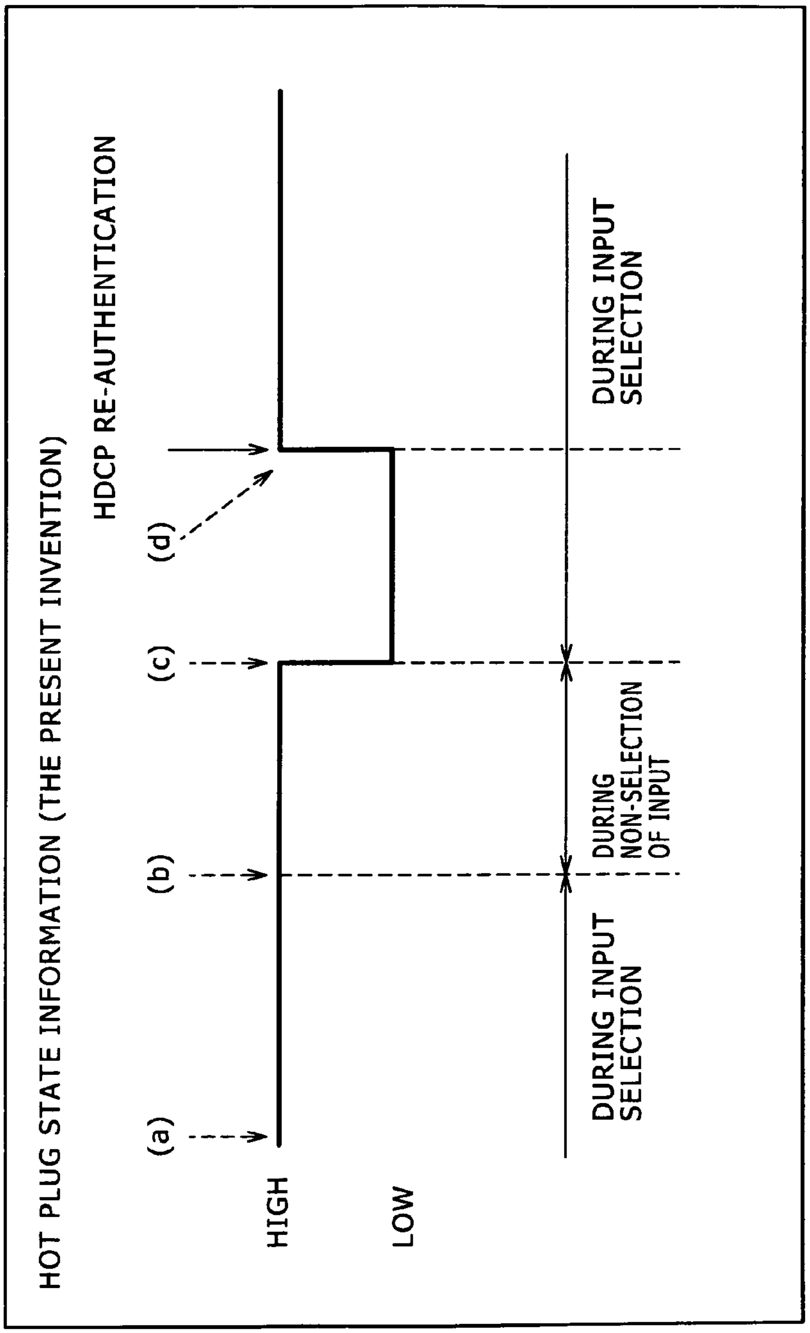
FIG. 7 is a chart showing an example of a hot plug change state in accordance with an embodiment of the present invention.

In the structure of the present invention, control as described below is performed in order to avoid such a situation. FIG. 7 shows a state transition diagram of the hot plug according to the present invention. A transition process of the hot plug state as shown in FIG. 7 is performed under control of a host control unit 325 of the HDMI sink 320 as described with reference to FIG. 5.

The section "ab" shown in FIG. 7 is a period when the source is in the selection state as the contents input device, during which time the host control unit (CPU) 325 sets the state of the hot plug 324 as "high". In this selection state, the selection source is allowed to read the data in EDID-ROM 321.

The point "b" is a timing at which the source is changed from the state of being selected as the contents input device to the non-selection state. For example, there may be mentioned the case where a user operates a remote control unit of TV which is a sink, to switch the source devices. In the example as described above with reference to FIG. 6, at a timing when the source is thus changed from the state of being selected as the contents input device to the non-selection state, the host control unit (CPU) 325 of the sink 320 performs the control to change the state of the hot plug 324 from "high" to "low".

In the structure of the present invention, at the timing (FIG. 7(*b*)) when the source is changed from the state of being selected as the contents input device to the non-selection state, the host control unit (CPU) 325 of the sink 320 performs the control to maintain the state of the hot plug 324 in the "high" state without changing from "high" to "low". This control allows the source in the non-selection state to read the data in EDID-ROM 321.

Further, the point "c" is the point at which the source is again set as the selection state as the contents input device. At the timing when this non-selection state is changed to the selection state, the host control unit (CPU) 325 of the sink 320 changes the state of the hot plug 324 from "high" to "low" and changes again the state of the hot plug 324 from "low" to "high" at the point (d).

In other words, when the source is changed from the non-selection state to the selection state, a process is carried out in which the state of the hot plug 324 is temporarily changed to "low" then rechanged to "high". At a timing (FIG. 7(*d*)) when the hot plug state is changed from "low" to "high", the authentication process is started between the selection source and the sink. After completion of the authentication process, the substantive processes, such as the contents transmission etc. are permitted.

Thus, the control unit of the data receiver of the present invention, i.e., the data receiver as the sink which receives the transmission contents from the source which performs the contents transmission process, changes the setup of the hot plug state which can be detected by the source, as a process of notifying the source of whether or not the data stored in the device information storing memory (EDID-ROM) are obtainable, sets the hot plug state as "high" indicative of being in the state where the data stored in the memory are permitted to be obtained, in the selection state where the source is selected as the contents input device, and is controlled to maintain the setup of "high" even in the case where the source is changed to the non-selection state from the selection state of being selected as the contents input device. Further, when the source is changed to the selection state from the non-selection state where the source is not selected as the contents input device, the control is carried out such that the hot plug state is temporarily changed to the setup of "low" indicative of being in the state where obtainment of data stored in the memory is not permitted to be obtained, then to rechange to the setup of "high" again.

Even in the non-selection state where the source is not selected as the contents input device, by performing such control, the control unit of the sink performs the control to permit the source to read the address information stored in the device information storing memory (EDID-ROM). Even in the non-selection state where the source is not selected as the contents input device, by providing the state in which the address mapping is allowed, the control of allowing an information and communications process through the CEC (Consumer Electronics Control) line which is a control information communications line between the source and the sink is carried out.

In addition, the data transmitter as the source which transmits the contents to the sink has a hot plug detection unit for detecting the state of the hot plug connected with the sink, and a control unit for determining, according to the state detected by the hot plug detection unit, whether or not the data stored in the device information storing memory provided for the sink are obtainable and for reading the data stored in the device information storing memory according to the determination result. Even in the case where the source is in the non-selection state of not being selected as the contents input device with respect to the sink, the hot plug detection unit of the source detects the hot plug state which is in the setup where obtainment of the data stored in the device information storing memory is allowed, and the control unit of the source reads the data stored in the device information storing memory of the sink even during a period when the sink is in the non-selection state.

As described above with reference to FIG. 7, in the hot plug control process in accordance with the present invention, even in the case where the source is changed to the non-selection state from the state of being selected as the contents input device, the state of the hot plug 324 is maintained to "high", and therefore it becomes possible for the source in the non-selection state to read the record data in the device information storing memory (EDID-ROM) on the sink side. Further, as described before with reference to FIG. 3, it becomes possible to perform the address mapping process, and to obtain information, such as resolution information and format information acceptable by the sink device, such as TV, etc. Further, it becomes possible to perform various types of control accompanied by communications between the source and the sink by means of the CEC line 132 (see FIG. 1), such as for example the all off, the one-touch play, as described above.

Furthermore, in the case where the source which becomes once in the non-selection state is again set as the selection state, it is arranged that the state of the hot plug 324 is changed from "high" to "low", and further the state of the hot plug 324 is rechanged from "low" to "high" at the point (d), whereby as described with reference to FIG. 6, the authentication process which is specified to be performed in the case where the state of the hot plug 324 is changed from "low" to "high" is performed reliably, and the contents transmission process in which the security in compliance with the standard of HDCP (High-bandwidth Digital Content Protection) is secured is realized.

Figure 8:
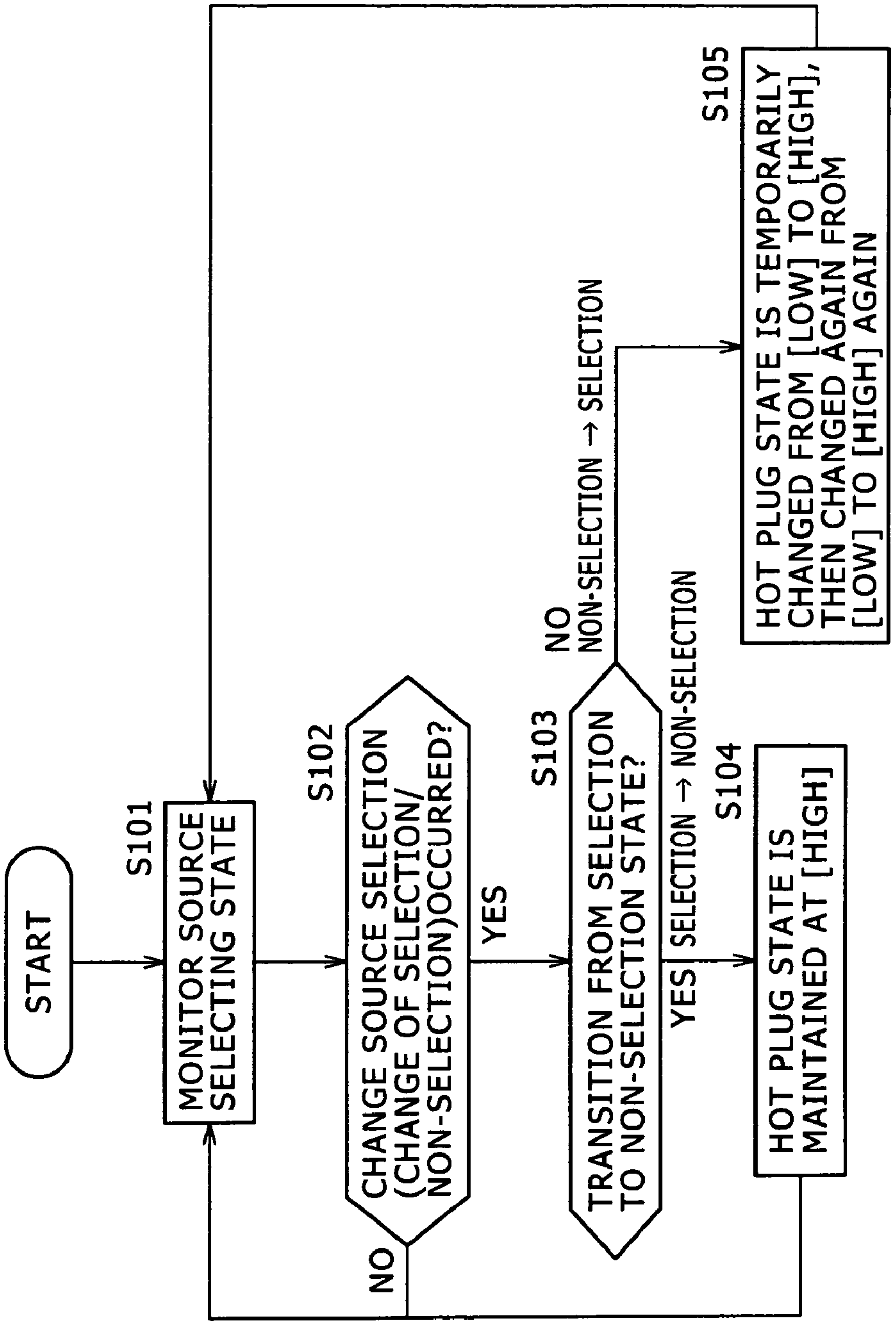
FIG. 8 is a flow chart for explaining sequence of a hot plug change state processing in accordance with an embodiment of the present invention.

With reference to a flow chart as shown in FIG. 8, a sequence of the hot plug control process performed in the host control unit (CPU) 325 of the sink 320 will be described. Firstly, in step S101, the host control unit (CPU) 325 monitors the selection state of the source. In addition, a source selection state is switched by the remote control operation by a user etc., and determination is made based on these operation information.

In step S102, it is determined whether or not a change of the selection state of source is detected. In the case where it is detected, the process moves to step S103 and it is determined whether it is a change from the source selection state to the non-selection state or it is a change from a source non-selection state to the selection state.

In step S103, in the case where it is determined to be the change from the source selection state to the non-selection state, the process advances to step S104. In addition, this change corresponds to the point (b) shown in FIG. 7. In this case, in step S104, the control to maintain the hot plug state to be "high" is continued.

On the other hand, in step S103, in the case where it is determined to be the change from the source non-selection state to the selection state, the process moves to step S105. In addition, this change corresponds to the point (c) shown in FIG. 7. In this case, in step S105, the control is performed to temporarily change the hot plug state from "high" to "low" and then to change again from "low" to "high".

As above, the present invention is described in detail with reference to the specific examples. However, it is obvious that a person with an ordinary skill in the art can perform modification and substitution of the embodiments without departing from the gist of the present invention. In other words, the present invention is disclosed by way of exemplification, and it should not be interpreted limitedly. In order to determine the scope of the present invention, claims should be taken into consideration.

Further, a series of processes as described in the present specification can be carried out by hardware, software, or a combination of both. When performing the process by software, the program having recorded therein a processing sequence can be implemented by installing it in the memory of the computer in which the dedicated hardware is built in. Alternatively, the program can be installed and executed in the general-purpose computer which can perform various processes. For example, the program can be recorded in a recording medium in advance. The program can be not only installed in the computer from the recording medium, programs can be also received through networks, such as LAN (Local Area Network) and the Internet to install the programs in recording media, such as a built-in hard disk.

It should be noted that various types of processes described in the present specification may be performed not only in chronological order according to the description but also in parallel or individually according to throughput of the apparatus for performing the processes or as needed. Further, in the present specification, by system means a logical set structure of a plurality of apparatuses, and it is not limited to one that has apparatuses of respective structures in the same casing.

As described above, according to the arrangement of one embodiment of the present invention, even in the case where the source is changed from the state of being selected as the contents input device to the non-selection state, the state of the hot plug is set up to remain "high", whereby the source in the non-selection state can obtain the data in the device information storing memory (EDID-ROM) on the sink side, and it becomes possible to perform the address mapping process, to obtain the resolution information on the sink device, the accepted format information, etc., and to perform various types of control accompanied by communications between the source and the sink by means of the CEC line, such as the all-off, the one-touch play, for example.

It should be understood by those skilled in the art that various modifications, combinations, sub-combinations and alterations may occur depending on design requirements and other factors insofar as they are within the scope of the appended claims or the equivalents thereof.

What is claimed is:

1. A data receiver as a sink for receiving a transmission content from a source performing a content transmission process, the data receiver comprising:

a memory for storing device information;

a control unit for changing a setup of a hot plug state in which the source may be detected as one among a plurality of sources selectable by the data receiver as a contents input device, as a process of notifying the source whether the data stored in the memory of the data receiver can be obtained by the source or not, and, the control unit is arranged to set the hot plug state as a setup indicative of being in a state where the data stored in the memory of the data receiver is permitted to be obtained by the source, in a selection state where the source is selected by the data receiver as the contents input device, and control is performed by the control unit in the data receiver to maintain a setup showing that the hot plug state is in a state where data stored in the memory of the data receiver is permitted to be obtained by the source, in a case where the source is changed to a non-selection state by the data receiver from the selection state in which the source is selected as the contents input device, wherein the control unit is further configured to:

set the hot plug state to be a "High" (High), in the selection state where the source is selected as the contents input device, to maintain the state where the hot plug state is set to be "High", even in the case where the source is changed to the non-selection state from the selection state in which the source is selected as the contents input device, and when the source is changed to the selection state from the non-selection state in which the source is not selected as the contents input device, to change the hot plug state to a "Low" (Low) temporarily, and then to rechange the hot plug state to "High" again.

2. The data receiver according to claim 1, wherein;

a setting of authentication start conditions between the source and the sink is performed by the control unit when the hot plug state is rechanged from the temporary "Low" state to the "High" state again.

3. The data receiver according to claim 1, wherein;

address information applied to address mapping by the source is stored in the memory, and the control unit has a configuration in which control is performed to permit the source to read the address information stored in the memory, even if the source is in the non-selection state where the source is not selected as the contents input device.

4. The data receiver according to claim 1, wherein;

the source and a sink are connected by a HDMI (High Definition Multimedia Interface) cable.

5. The data receiver according to claim 1, wherein;

the control unit has a configuration in which, even if the source is in the non-selection state where the source is not selected as the contents input device, control is performed to enable an information and communications process between the source and the sink, via a control information communications line.

6. The data receiver according to claim 5, wherein;

the control information communications line is a CEC (Consumer Electronics Control) line specified by a HDMI standard.

7. An information processing method in a data receiver as a sink for receiving transmission contents from a source for performing a contents transmission process, wherein;

the source is a selectable one among a plurality of sources selectable by the data receiver as a contents input device, and, as a process of notifying the source whether data stored in a device information storing memory of the data receiver is obtainable or not, a control unit in the data receiver performs a hot plug control step of changing a setup of a hot plug state in which the source may be detected among the plurality of sources selectable by the data receiver, the hot plug control step is a step of setting the hot plug state as a first state where obtainment by the source of the data stored in the device information storing memory of the data receiver is permitted, in the selection state where the source is selected by the data receiver as the contents input device from among the plurality of sources, performing control to maintain a setup where the hot plug state is in the first state where obtainment by the source of the data stored in the device information storing memory of the data receiver is permitted, in a case where the source is changed to the non-selection state by the data receiver from the selection state in which the source is selected as the contents input device and, when the source is changed to the selection state from the non-selection state, performing control to change the hot plug state to a second state where obtainment by the source of the data stored in the device information storing memory of the data receiver is not permitted, and then to rechange the hot plug state to the first state again.

8. A computer program stored on a non-transitory computer readable medium for implementing an information process in a data receiver as a sink for receiving transmission contents from a selectable source among a plurality of sources selectable by the data receiver as a contents input device for performing a contents transmission process, the computer program comprising:

a step of causing a control unit in the data receiver to perform a hot plug control step of changing a setup of a hot plug state which can be detected by the source, as a process of notifying the source whether data stored in a device information storing memory of the data receiver is obtainable by the source or not; wherein the hot plug control step is a step of setting the hot plug state as a setup indicative of being in a "High" state where the data stored in the memory of the data receiver is permitted to be obtained by the source, in the selection state where the source is selected as the contents input device by the data receiver, performing control to maintain a setup indicating that the hot plug state is in the "High" state where obtainment by the source of the data stored in the memory of the data receiver is permitted, in the case where the source is changed by the data receiver to a non-selection state from the selection state in which the source is selected as the contents input device, and, when the source is changed to the selection state from the non-selection state, performing control to change the hot plug state to a "Low" state where obtainment by the source of the data stored in the device information storing memory of the data receiver is not permitted, and then to rechange the hot plug state to the "High" state again.

* * * * *